United States Patent
Nakaya

(10) Patent No.: US 10,552,093 B2
(45) Date of Patent: Feb. 4, 2020

(54) ELECTRONIC DEVICE AND RECORDING MEDIUM

(71) Applicant: KYOCERA Document Solutions Inc., Osaka (JP)

(72) Inventor: Tomoki Nakaya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/965,846

(22) Filed: Apr. 28, 2018

(65) Prior Publication Data
US 2018/0314474 A1    Nov. 1, 2018

(30) Foreign Application Priority Data
Apr. 28, 2017  (JP) .................. 2017-089655

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *H04N 1/00517* (2013.01); *H04N 1/00411* (2013.01)

(58) Field of Classification Search
CPC .................................. H04N 1/00517
See application file for complete search history.

(56) References Cited

U.S. PATENT DOCUMENTS

| | | | |
|---|---|---|---|
| 6,336,151 B1* | 1/2002 | Seki ............... | G06F 9/4411 709/217 |
| 2003/0202010 A1* | 10/2003 | Kerby ............. | G06F 3/1205 715/744 |
| 2005/0111866 A1* | 5/2005 | Sato ............... | G03G 15/5016 399/79 |

(Continued)

FOREIGN PATENT DOCUMENTS

| | | | |
|---|---|---|---|
| CN | 103108096 A | 5/2013 | |
| EP | 2790395 A2 * | 10/2014 | ......... H04N 1/00413 |

(Continued)

OTHER PUBLICATIONS

China National Intellectual Property Administration. Office Action of foreign counterpart, dated Jun. 11, 2019.

*Primary Examiner* — Ted W Barnes
(74) *Attorney, Agent, or Firm* — Hawaii Patent Services; Nathaniel K. Fedde; Kenton N. Fedde

(57) ABSTRACT

Provided is an electronic device that greatly simplifies a setting operation when using an operation history. The electronic device of this disclosure includes a panel part, a system control part, a setting operation management part, and a function part. The system control part conducts a download of one of an individual operation history and an entire operation history for each selection item, as setting history of selection information, from a management server according to a procedure of a setting assistance application program which has been downloaded from the management server and which is assigned to each user. The setting (Continued)

operation management part manages the setting information included in the downloaded setting history for each the selection item. The function part executes a processing based on the setting information managed by the setting operation management part.

13 Claims, 11 Drawing Sheets

(56) References Cited

U.S. PATENT DOCUMENTS

| | | | | |
|---|---|---|---|---|
| 2008/0016090 | A1* | 1/2008 | Fukata | G06F 3/048 |
| 2009/0217193 | A1* | 8/2009 | Tanaka | H04N 1/00411 |
| | | | | 715/781 |
| 2010/0290071 | A1* | 11/2010 | Okada | H04N 1/00244 |
| | | | | 358/1.13 |
| 2011/0199623 | A1* | 8/2011 | Okuyama | H04N 1/00408 |
| | | | | 358/1.9 |
| 2012/0062937 | A1* | 3/2012 | Kirihara | H04N 1/00517 |
| | | | | 358/1.15 |
| 2012/0075653 | A1* | 3/2012 | Takai | G03G 15/502 |
| | | | | 358/1.13 |
| 2013/0201529 | A1* | 8/2013 | Morita | H04N 1/00408 |
| | | | | 358/402 |
| 2013/0278960 | A1* | 10/2013 | Nishiyama | H04N 1/0084 |
| | | | | 358/1.14 |
| 2014/0300920 | A1* | 10/2014 | Hayashi | H04N 1/00413 |
| | | | | 358/1.14 |
| 2015/0149923 | A1* | 5/2015 | Shogaki | G06F 21/608 |
| | | | | 715/747 |
| 2015/0264206 | A1* | 9/2015 | Maeda | H04N 1/00509 |
| | | | | 358/1.13 |
| 2015/0381834 | A1 | 12/2015 | Mizuno | |
| 2016/0006887 | A1* | 1/2016 | Takenaka | H04N 1/4433 |
| | | | | 358/1.13 |
| 2016/0378413 | A1* | 12/2016 | Enokizono | G06F 3/1257 |
| | | | | 358/1.16 |
| 2017/0070625 | A1* | 3/2017 | Yee | H04N 1/00517 |
| 2017/0155780 | A1* | 6/2017 | Ishihara | G06F 3/1204 |
| 2017/0269880 | A1 | 9/2017 | Hayashi | |
| 2018/0220015 | A1* | 8/2018 | Akuzawa | H04N 1/00389 |

FOREIGN PATENT DOCUMENTS

| | | |
|---|---|---|
| EP | 2790395 A2 | 10/2014 |
| JP | 2005-153346 A | 6/2005 |

* cited by examiner

FIG. 2B

SETTING ASSISTANCE SCREEN (A)

User ID : 0001

- PRINT (105e)
- COPY (105f)
- FAX (105g)
- DATA TRANSMISSION/RECEIPT (105h)
- NEXT (105i)

105A

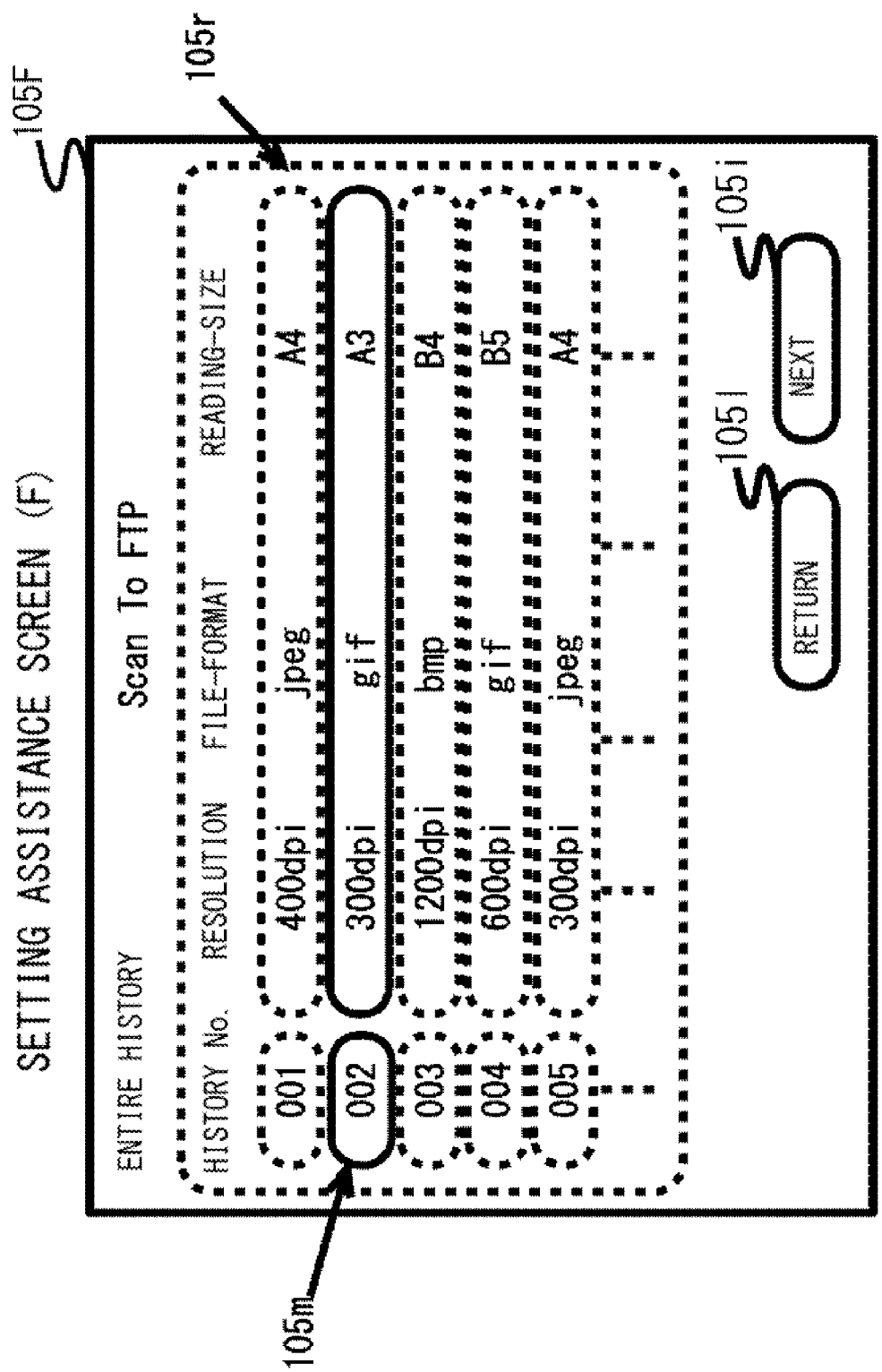

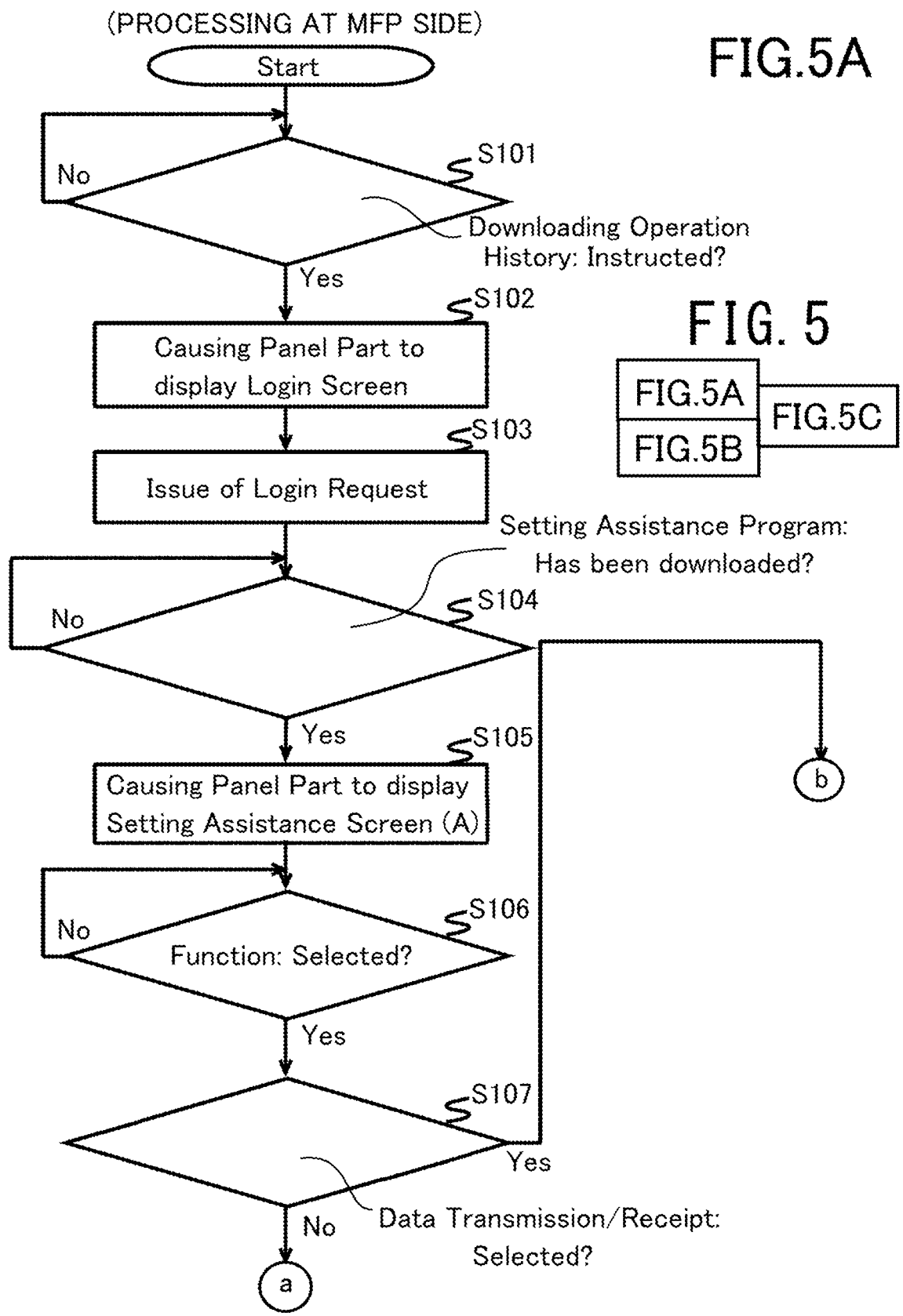

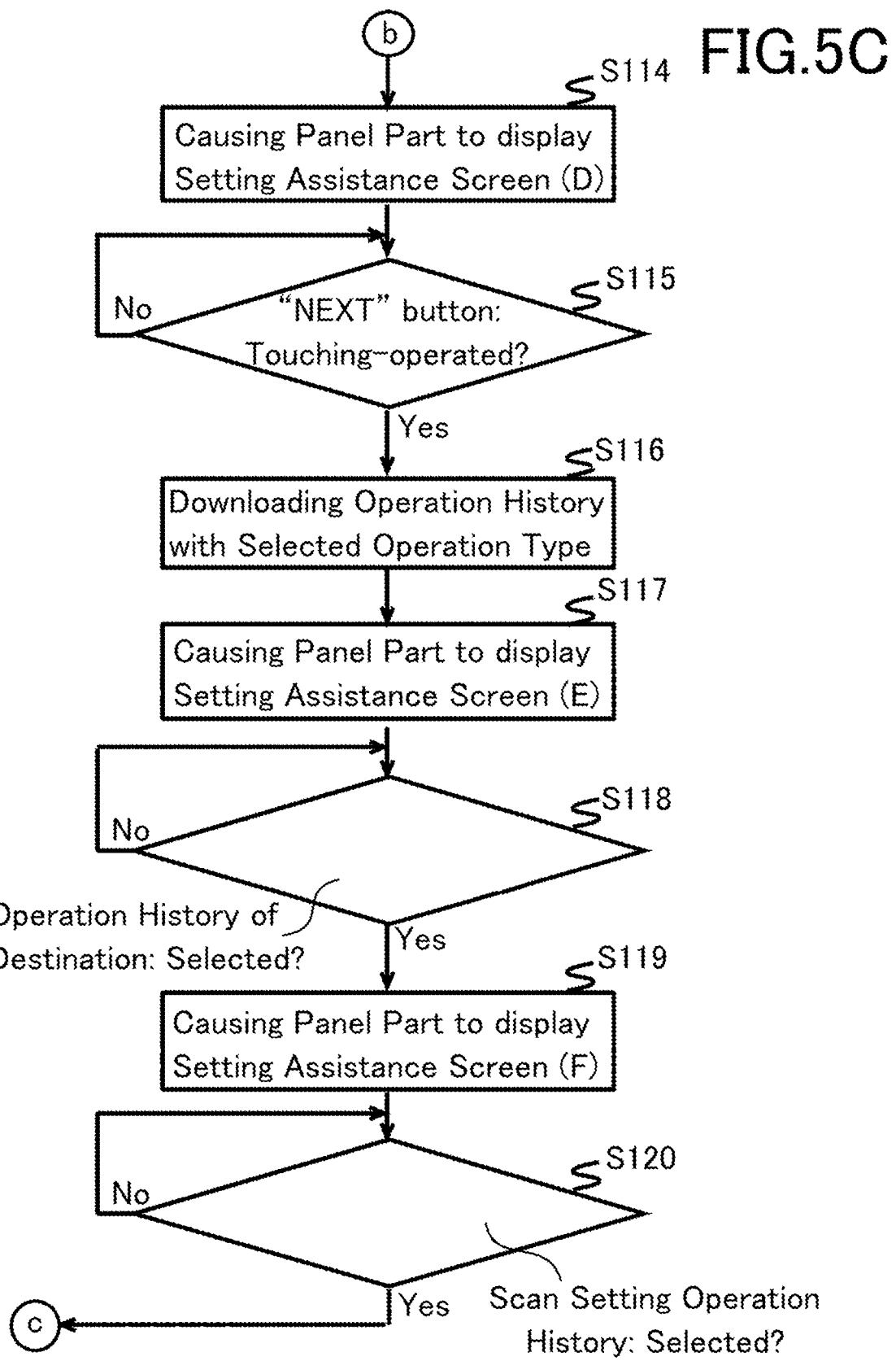

ELECTRONIC DEVICE AND RECORDING MEDIUM

INCORPORATION BY REFERENCE

This application is based on and claims the benefit of priority from Japanese Patent Application No. 2017-089655 filed on Apr. 28, 2017 the contents of which are hereby incorporated by reference.

BACKGROUND

The present disclosure relates to an electronic device and a recording medium which are suitable for setting operation of various functions of the electronic device.

For example, electronic devices such as MFPs equipped with a printing function, a copy function, a FAX function, a data transmission/reception function via a network, and the like. Incidentally, when using these functions, there are cases where a setting operation for each setting item in each the function is required. More specifically, for example, when the copy function is taken as an example, there are setting items such as density, magnification, resolution, number of copies, and the like. In this case, the setting contents in each the setting item is stored in a storage device such as a HDD, and therefore if the setting item remains unchanged, the previous setting contents can be taken over.

However, if the MFP is installed in an environment that can be used by multiple users, the contents of the setting item may be changed by each user. In this case, for example, when the copy function is used with the contents of the previous setting item, it is necessary to perform the setting operation of the setting item once again depending on a certain user, and the setting operation is troublesome.

As a typical example to solve such a troublesome setting operation, the following image forming device has been proposed. In this image forming device, a main controller performs individual authentication for authenticating an individual, and an operation history based on the inputted operation command is stored in the HDD part for each authenticated individual. Then, based on the stored operation histories of the each individual, the liquid crystal panel is caused to display the operation histories of the authenticated individual and a setting is made based on selecting one from the displayed operation histories.

SUMMARY

An electronic device of the present disclosure includes a panel part, a system control part, a setting operation management part, and a function part. The system control part conducts a download of one of an individual operation history and an entire operation history for each selection item, as setting history of selection information, from a management server according to a procedure of a setting assistance application program which has been downloaded from the management server and which is assigned to each user. The setting operation management part manages the setting information included in the downloaded setting history for each the selection item. The function part executes a processing based on the setting information managed by the setting operation management part.

A non-transitory computer-readable recording medium of the present disclosure stores a setting assistance application program downloaded to an electronic device from a management server to be executed by a computer. The setting assistance application program is assigned to each user and causes the computer to conduct a download of one of an individual operation history and an entire operation history for each selection item, as setting history of selection information, from a management server.

In the electronic device and the recording medium according to the present disclosure, the system control conducts a download of one of an individual operation history and an entire operation history for each selection item, as setting history of selection information, from the management server according to a procedure of the setting assistance application program which has been downloaded from the management server and which is assigned to each the user. In addition, the setting operation management part manages the setting information included in the downloaded setting history for each the selection item. Further, the function part executes the processing based on the setting information managed by the setting operation management part.

As a result, downloading of one of the individual operation history and the entire operation history for each selection item makes it possible to refer to one of the individual operation history and the entire operation history for each the function such as print, copy, or FAX function.

BRIEF DESCRIPTION OF THE DRAWINGS

FIG. 2B, which is for explaining of contents displayed on the panel part shown in FIG. 1, shows a setting assistance screen (A);

FIG. 4C, which is for explaining of contents displayed on the panel part shown in FIG. 1, shows a setting assistance screen (F)

DETAILED DESCRIPTION

Hereinbelow, with reference to FIGS. 1 through 4, a description will be made as to an electronic device of an embodiment of the present disclosure. It is to be noted that in the following description, the electronic device is assumed to be an MFP that is a multi-functional peripheral device equipped with a printing function, a copy function, a FAX function, a data transmission/reception function via a network, and the like.

Figure 1:
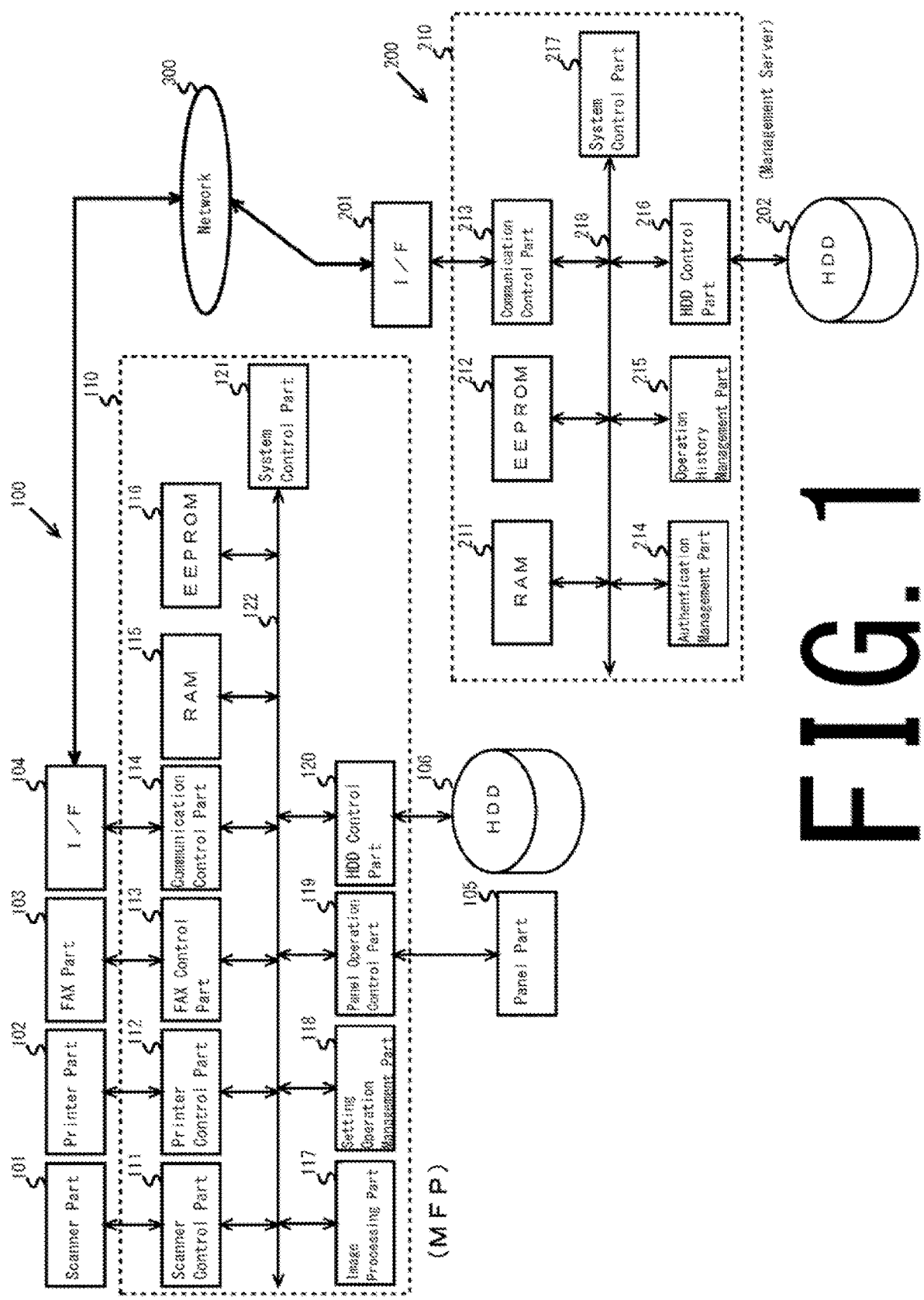
FIG. 1 shows an electronic device according to an embodiment of the present disclosure.

First, as shown in FIG. 1, an MFP 100 is connected, via a network 300 such as the Internet, to a management server 200 that manages an operation history and the like which is a setting history of setting information for each of functions of the MFP 100. In addition, the functions include, for example, the above-described printing function, copy function, FAX function, and data transmission/reception function via the network. Further, the MFP 100 receives a setting assistance application program from the management server 200 which is assigned to each user to assist the setting operation of each the function described above. Moreover, in accordance with setting contents set by the setting assistance application program, the MFP 100 conducts a download of an individual operation history (hereinafter, which will be referred to as "individual history") as an operation history i.e., as the setting history related to the setting operation and an entire operation history (hereinafter, which will be referred to as "entire history").

Here, the MFP 100 includes a control part 110 that controls operations of a scanner part 101, a printer part 102, a FAX part 103, an I/F 104, a panel part 105, and a HDD 106.

The scanner part 101 is a device that converts an image of a manuscript read by an image sensor into digital image data and inputs the digital image data to the control part 110. The printer part 102 is a device that prints an image on a sheet of paper based on print data output from the control part 110. The FAX part 103 is a device that transmits data output from the control part 110 to an opposite-side facsimile through a telephone line and receives data from an opposite-side facsimile to input the received data to the control part 110.

The I/F 104 is connected to the management server 200 via the network 300. It is to be noted that that the I/F 104 may be responsible for communication with other MFPs, user terminals and the like, or may be responsible for communication with a content server, a web server, or the like. The panel part 105 is a device such as a touch panel that displays the printing function, copy function, FAX function, the data transmission/reception function via the network 300 of the MFP 100, and settings for various settings. In addition, the panel part 105 displays, shown later in FIG. 2 and FIG. 3, a login screen 105G, and setting assistance screens (A) 105A to (F) 105F, which will be detailed later. The HDD 106 is a storage device that stores programs including, for example, an application program that provides the various functions of the MFP 100. In addition, the HDD 106 also has a user box that stores, for example, print jobs registered from the user terminal side and print correspondence data written in the page description language. Further, the HDD 106 stores a setting assistance application program assigned to each user which is downloaded from the management server 200, and the individual history or the entire history relating to the setting operation.

The control part 110 is a processor that executes, to control the overall operation of the MFP 100, application programs including, for example, an authentication program, an image forming program, a control program, and the like. The control part 110 includes a scanner control part 111, a printer control part 112, a FAX control part 113, a communication control part 114, a RAM 115, an EEPROM 116, an image processing part 117, a setting operation management part 118, a panel operation control part 119, an HDD control part 120, and a system control part 121. In addition, these are connected to a data bus 122.

The scanner control part 111 controls a reading operation of the scanner part 101. The printer control part 112 controls a printing operation of the printer part 102. The FAX control part 113 controls a data transmission/reception operation that the FAX part 103 conducts. The communication control part 114 controls, via the I/F 104 and the network 300, transmission/reception of setting assistance application programs, data, and the like.

The RAM 115 is a work memory used for executing programs. In addition, the RAM 115 stores print data subjected to image processing by the image processing part 117. In the EEPROM 116, a control program is stored that checks the operation of each the part and the like is stored. The image processing part 117 subjects the image data read by the scanner part 101 to image processing (rasterizing). Further, the image processing part 117 subjects the print target data registered in the user box of the HDD 106 to image processing (rasterization). It is to be noted that the system control part 121 causes the RAM 115 to store therein temporarily the print data that has been image-processed by the image processing part 117.

The setting operation management part 118 manages the individual history or the entire history related to the setting operation which are downloaded from the management server 200. The panel operation control part 119 controls a display operation of the panel part 105. In addition, the panel operation control part 119 accepts, via the panel part 105, an initiation of printing, copy, FAX, data transmission/reception via the network 300, and the like. Further, the panel operation control part 119 causes the panel part 105 to display the login screen 105G that will be shown later in FIG. 2A or the setting assistance screen (A) 105A that will be shown later in FIG. 2B and accepts the setting of each setting item. The HDD control part 120 controls data reading from and data writing in the HDD 106.

The system control part 121 controls the cooperative operations between each of the parts. In addition, the system control part 121, when copy, printing, or the like is selected via the panel part 105, causes the scanner part 101 to control the scanner control part 114 for manuscript reading or causes the printer control part 112 to control the printer part 102 for print on sheets of paper. Further, the system control part 121, when a user ID and his/her password are inputted via the login screen 105G displayed on the panel part 105, transmits a login request to the management server 200 via the communication control part 114. In addition, the system control part 121, after the login request, downloads a setting assistance application program that is assigned to each user from the management server 200, and stores the resulting program in the HDD 106. Further, the system control part 121 executes the setting assistance application program and causes, according to the procedure of the setting assistance application program, via the panel operation control part 119, the panel part 105 to display the setting assistance screen (A) 105A shown in FIG. 2B that will be described later, the setting assistance screen (B) 105B shown in FIG. 3A, the setting assistance screen (C) 105C shown in FIG. 3A, the setting assistance screen (D) 105D shown in FIG. 4A, the setting assistance screen (E) 105E shown in FIG. 4B, the setting assistance screen (F) 105F shown in FIG. 4C, and the like. Moreover, the system control part 121 causes the HDD 106 to store the individual history and/or the entire history that are downloaded from the management server 200. Furthermore, the system control part 121, when any one of user-designated printing, copy, FAX, and data transmission/reception via the network 300 completes, deletes the setting assistance application program, and the individual history and/or the entire history that are stored in the HDD 106. As a result, it is possible for the HDD 106 to suppress its storage capacity.

Meanwhile, the management server 200 includes a control part 210 that controls an I/F 201 and a HDD 202. The I/F 201 is connected, via the network 300, to the MFP 100. It is to be noted that the I/F 201 may be responsible for communication with other MFPs, user terminals, and the like. The HDD 202 stores the setting assistance application program, the individual history, the entire history, and the like. The setting assistance application program, which is assigned to each user, is associated with, for example, the user ID shown in FIG. 2A which will be described later. The individual history indicates the operation history for each user. The entire history is an integration of the operation histories of each user and does not include individual information that specifies an individual.

The control part 210 is a processor that executes a control program and the like to control an overall operation of the management server 200. The control part 210 includes a RAM 211, an EEPROM 212, a communication control part 213, an authentication management part 214, an operation history management part 215, an HDD control part 216, and a system control part 217. In addition, these are connected to a data bus 218.

The RAM 211 is a work memory used for executing programs. In the EEPROM 212, a control program and the like are stored which checks the operation of each the part and the like. The communication control part 213 controls, via the I/F 201, transmission and reception of data and the like in a manner via the network 300. In addition, the communication control part 213 receives a login request from the MFP 100, a request for individual history and/or entire history, and the like. Further, the communication control part 213 transmits the setting assistance application program, and the individual history and/or the entire history to the MFP 100.

The authentication management part 214 authenticates the user ID and his/her password entered via the login screen 105 G shown in FIG. 2A which will be described later. The operation history management part 215 manages, using an operation history management table, the setting assistance application program, the individual history, and the entire history which are stored in the HDD 202. In addition, the operation history management part 215 manages the setting assistance application program and the individual history in association with the user ID. When the authentication management part 214 succeeds in authentication, the operation history management part 215 reads the setting assistance application program assigned to each user from the HDD 202. In addition, when there is a request for individual history from the MFP 100, the operation history management part 215 reads the individual history associated with the user ID authenticated by the authentication management part 214 from the HDD 202. Further, when there is a request of the entire history from the MFP 100, the operation history management part 215 reads the entire history from the HDD 202. Moreover, the operation history management part 215 causes selected contents on the setting assistance screen (A) 105 A shown in FIG. 2B, the setting assistance screen (B) 105 B shown in FIG. 3A, the setting assist screen (C) 105 C shown in FIG. 3B, the setting assist screen (D) 105D shown in FIG. 4B, the setting assist screen (E) 105E shown in FIG. 4B, and the setting assist screen (F) 105F shown in FIG. 4C to be reflected on the individual history and the entire history that are stored in the HDD 202.

The system control part 217, when receiving the login request from the MFP 100 via the communication control part 213, causes the authentication management part 214 to conduct user authentication. In addition, the system control part 217, when receiving a login request from the MFP 100, transmits the setting assistance application program assigned to each user which the operation history management part 215 reads from the HDD 202 to the MFP 100 via the communication control part 213. Further, the system control part 217, when there is a request for individual history and/or entire history from the MFP 100, transmits the individual history associated with the user ID and/or the user ID that is not associated with the user ID which the operation history management part 215 reads to the MFP 100 via the communication control part 213.

Next, with reference to FIG. 2 to FIG. 4, a description will be made as to contents displayed on the panel part 105 of the MFP 100. At first, FIG. 2A shows the login screen 105G that appears, upon login to the management server 200, on the panel part 105. On the login screen 105 G, for example, there are displayed an input field 105$a$ for inputting a user ID (for example, 0001), an input field 105$b$ for inputting a password (****), an OK button 105$c$, and a cancel button 105$d$. In the input field 105$a$, the user ID assigned for each user is to be input. In the input field 105$b$, a password assigned to each user is to be input. It is to be noted that the password may be prepared for each user. The OK button 105$c$ is configured to operate in a touching manner for confirming the user ID and password that are entered in the input fields 105$a$ and 105$b$. As a result, the system control part 121 issues a login request to the management server 200 via the communication control part 114. It is to be noted that if the authentication of the user ID and password entered in the input fields 105$a$ and 105$b$ on the management server 200 side is in failure, the system control part 121 causes, via the panel operation control part 119, the panel part 105 to display an error message. The cancel button 105$d$ is configured to clear the login screen 105G in a touching manner.

Next, FIG. 2B shows the setting assistance screen (A) 105A for which the system control part 121 causes the panel part 105 to display according to the procedure of the setting assistance application program which is assigned to each user and which is downloaded from the management server 200. In addition, the setting assistance screen (A) 105A shows function selection related contents. On the setting assistance screen (A) 105A, there are displayed, for example, a print selection field 105$e$, a copy selection field 105$f$, a FAX selection field 105$g$, a data transmission/reception selection field 105$h$, and a next button 105$i$. Here, if any one of the print selection field 105$e$, the copy selection field 105$f$, the FAX selection field 105$g$, the data transmission/reception selection field 105$h$, and the next button 105$i$ is selected in a touching manner, for example, a dotted-line frame is caused to a solid-line frame. In the setting assistance screen (A) 105A shown in FIG. 2B, for example, there is displayed a case in which the copy selection field 105$f$ is selected. Further, for example, after selecting the copy selection field 105$f$, if the next control button 105$i$ is operated in a touching manner, the system control part 121 causes the panel part 105 to display the setting assistance screen (B) 105B shown in FIG. 3A. It is to be noted that if a touching operation is made on the next control button 105$i$ after selecting the data transmission/reception selection field 105$h$ on the setting assistance screen (A) 105A, the system control part 121 causes the panel part 105 to displays the setting assistance screen (D) 105D shown in FIG. 4A.

Figure 2A:
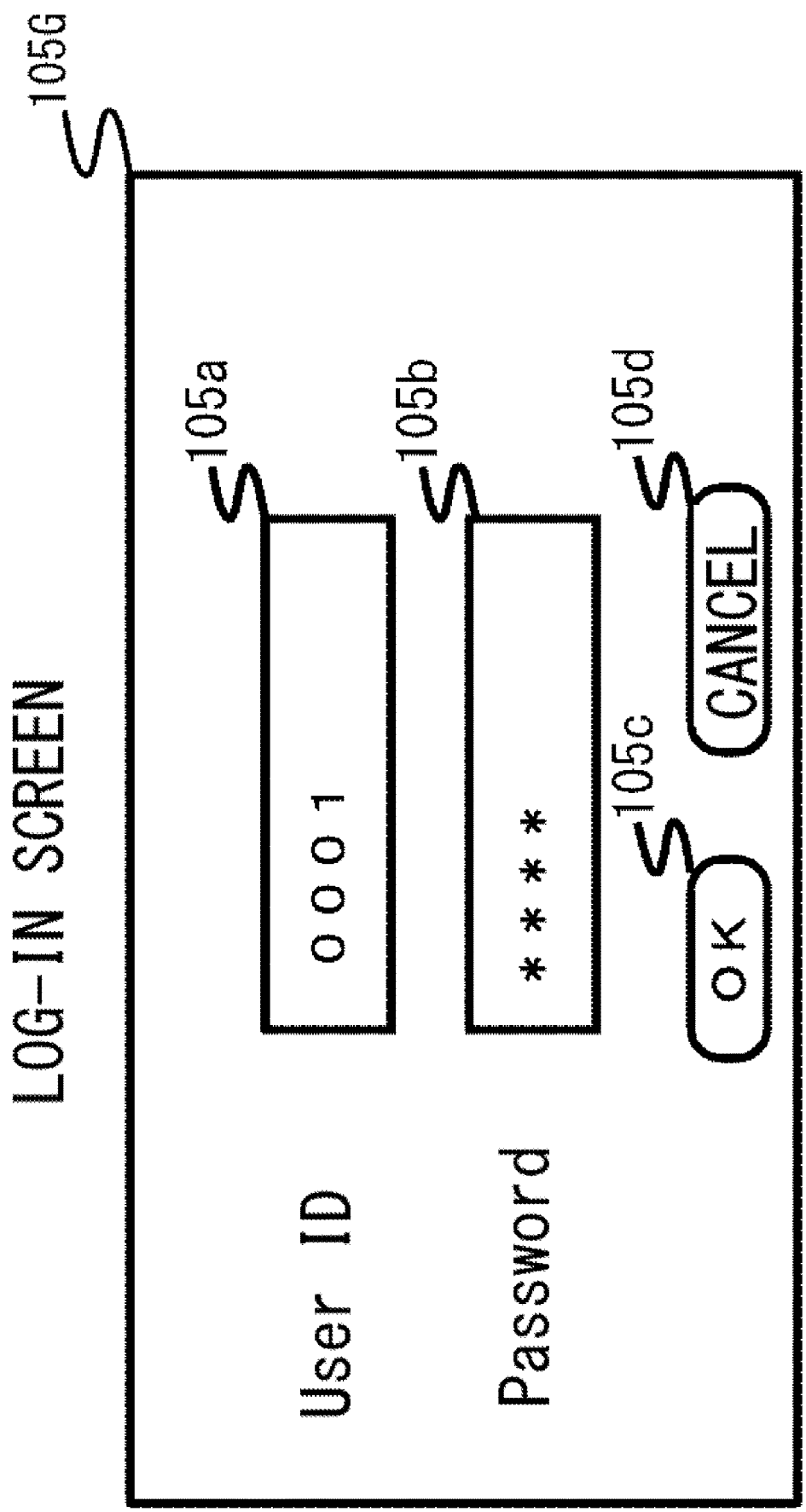
FIG. 2A, which is for explaining of contents displayed on a panel part shown in FIG. 1, shows a log-in screen.
Figure 3A:
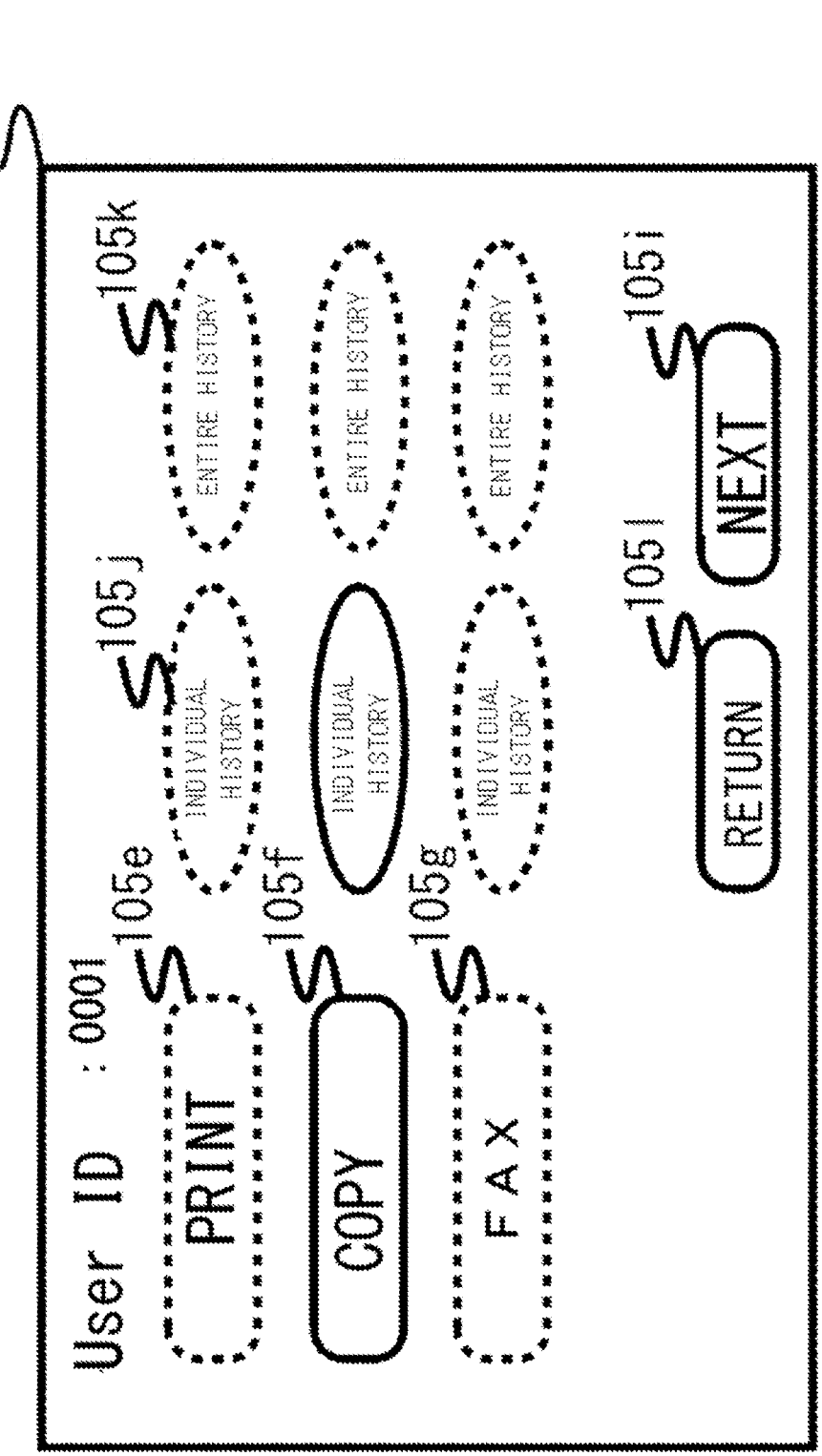
FIG. 3A, which is for explaining of contents displayed on the panel part shown in FIG. 1, shows a setting assistance screen (B)

Next, FIG. 3A shows the setting assistance screen (B) 105B that the system control part 121 displays on the panel part 105 according to the above described setting assistance program if, for example, any one of the print selection field 105$e$, the copy selection field 105$f$, and the FAX selection field 105$g$ is selected on the setting assistance screen (A) 105A shown in FIG. 2B. However, in the example of FIG. 3A, the copy election field 105$f$ is displayed as solid-line frame on the setting assistance screen (B) 105B in response to that the copy election field 105$f$ is selected on the setting assistance screen (A) 105A. On the setting assistance screen (B) 105 B, as selection items, for example, there are displayed the print selection field 105*e*, the copy selection field 105*f*, and the FAX selection field 105*g* which indicates function selection items of the MFP 100. Further, on the setting assistance screen (B) 105B, there are displayed, for example, a return button 105*l*, and the next button 105*i* are displayed. Moreover, an individual history selection field 105*j* and an entire history selection field 105*k* are displayed corresponding to each of the print selection field 105*e*, the copy selection field 105*f*, and the FAX selection field 105*g*.

Here, the setting assistance screen (B) 105B makes it possible to select either one of the individual history selection field 105*j* and the entire history selection field 105*k* in correlation to the copy selection field 105*f*. In the setting assistance screen (B) 105B shown in FIG. 3A, the individual history selection field 105*j*, which is correlated with the copy selection field 105*f*, is selected as an initial setting, which causes the individual history selection field 105*j* to be displayed in a solid-line frame. This indicates that the individual history is the initial setting for the copy function. At this time, if the entire history selection field 105*k* is touched, for example, the dotted-line frame of the entire history selection field 105*k* is changed to the solid line frame. Conversely, if a touching operation is conducted on the individual history selection field 105*j* while the entire history selection field 105*k* is selected, the dotted-line frame of the individual history selection field 105*j* is changed to the solid line frame. In addition, if a touching operation is conducted on the next button 105*i*, the system control part 121 fixes the selection content in the selection field indicated in the solid-line frame and requests the management server 200 of either the individual history or the entire history, as an operation history, that is correlated to the user ID (for example, 0001) and the selected function (i.e., the displayed function in the solid-line frame). If a touching operation is conducted on the next button 105*i* such that neither the individual history selection field 105*j* nor the entire history field is conducted in a touching manner after the setting assistance screen (B) 105B is displayed, the system control part 121 requests the management server 200 of the user ID and initial setting operation history. In the example illustrated in FIG. 3A, the user ID and the individual history that is correlated to the copy setting operation are requested. The system control part 121, when receiving the operation history (in this case, individual history) corresponding to the setting operation of the copy of the user ID (for example, 0001) from the management server 200, causes, via the panel operation control part 119, the panel part 105 to display the setting assistance screen (C) 105C shown in FIG. 3B.

It is to be noted that if a touching operation is conducted on the return button 105*l*, the setting assistance screen (A) 105A shown in FIG. 2B appears again. While the setting assistance screen (B) 105B shown in FIG. 3A appears, it is possible to conduct a touching operation on either the print selection field 105*e* or the FAX selection field 105*g*. In this case, the dotted-line frame of the print selection field 105*e* or the FAX selection field 105*g* whichever is selected is changed to a solid-line frame and the operation history (the individual history selection field 105*j* or the entire history selection field 105*k*) is indicated, as an initial setting correlated to the selected function, within solid-line frame.

Figure 3B:
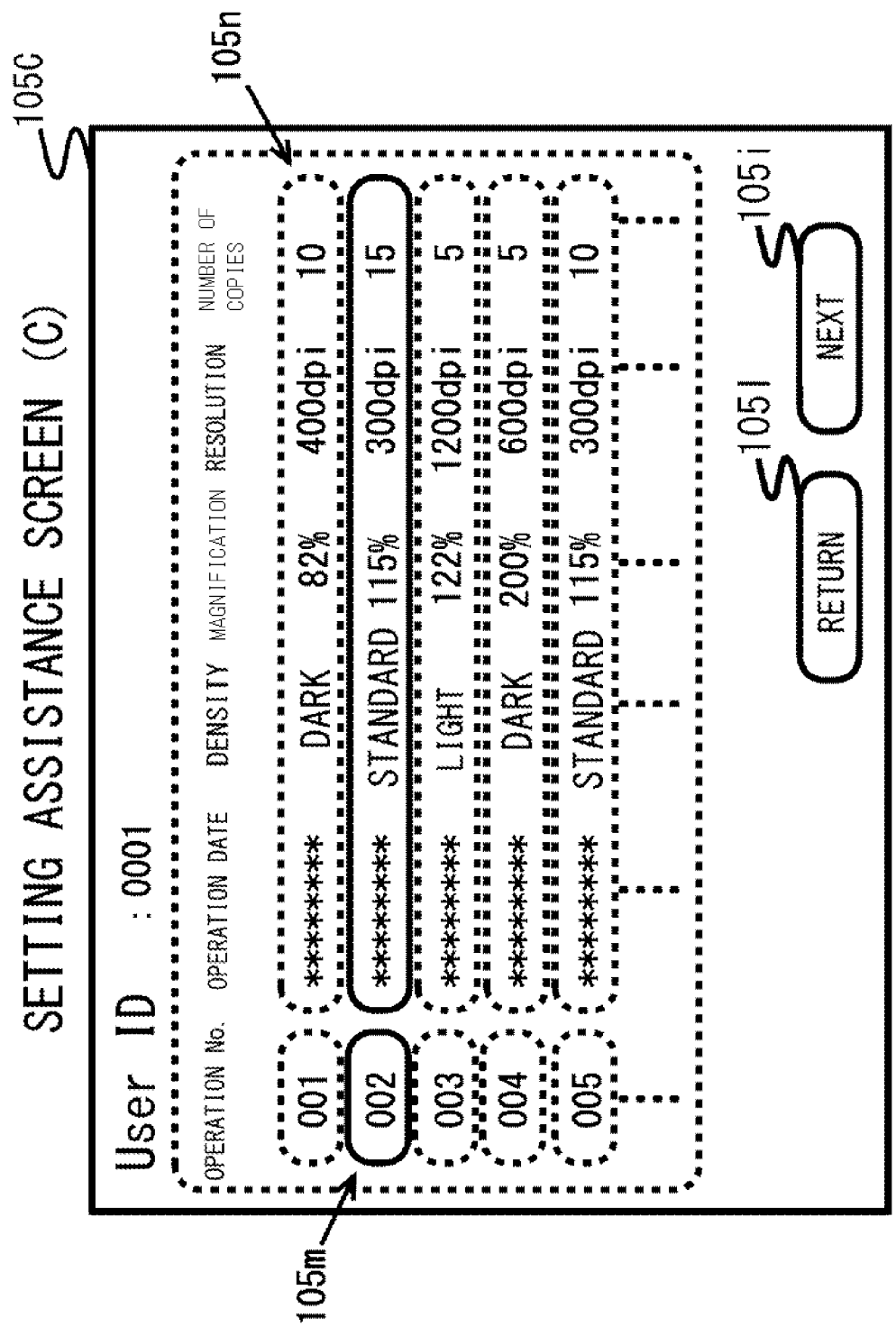
FIG. 3B, which is for explaining of contents displayed on the panel part shown in FIG. 1, shows a setting assistance screen (C)

Next, FIG. 3B shows the setting assistance screen (C) 105C for which the system control part 121 displays on the panel part 105 according to the above described setting assistance program if, for example, the copy operation history is selected as the individual history on the setting assistance screen (B) 105B shown in FIG. 3A. On the setting assistance screen (C) 105C, there is displayed, in correlation to a history number selection field 105*m*, copy setting information 105*n* including operation date/time and copy setting contents. It is to be noted that the copy setting information 105*n* correlated to the history number selection field 105*m* may be arranged either from newest operation date/time to the oldest (descending order) or from oldest operation date/time to the newest (ascending order). Also, available arrangement is in descending order of the use frequency (for example, the frequency at which the process was executed based on the selected copy setting information 105*n* or the frequency at which the selected copy setting information 105*n* was fixed for execution of the process). Here, if a touching operation is conducted, for example, on 002 of the history number selection field 105*m*, the display frame of the copy setting information 105*n* is changed from the dotted-line frame to the solid-line frame. Incidentally, for example, the copy setting information 105*n* correlated to 002 of the history number selection field 105*m* includes, other than the operation date/time, density (standard), magnification (115%), resolution (300 dpi), and the number of copies (15). Then, for example, if a touching operation is conducted on the next button 105*i* after selecting 002 of the history number selection field 105*m* by conducting a touching operation thereof, the system control art 121 causes the setting operation management part 118 to manage the selected copy setting information 105*n*. Further, the system control part 121 causes the printer control part 112 and the image processing part 117 to execute copy processing. At this time, the printer control part 112 and the image processing part 117 execute the copy processing based on the copy setting information 105*n* that is under management of the setting operation management part 118. If a touching operation is conducted on the return button 105*l*, the setting assistance screen (B) 105B shown in FIG. 3A comes back again.

Figure 4A:
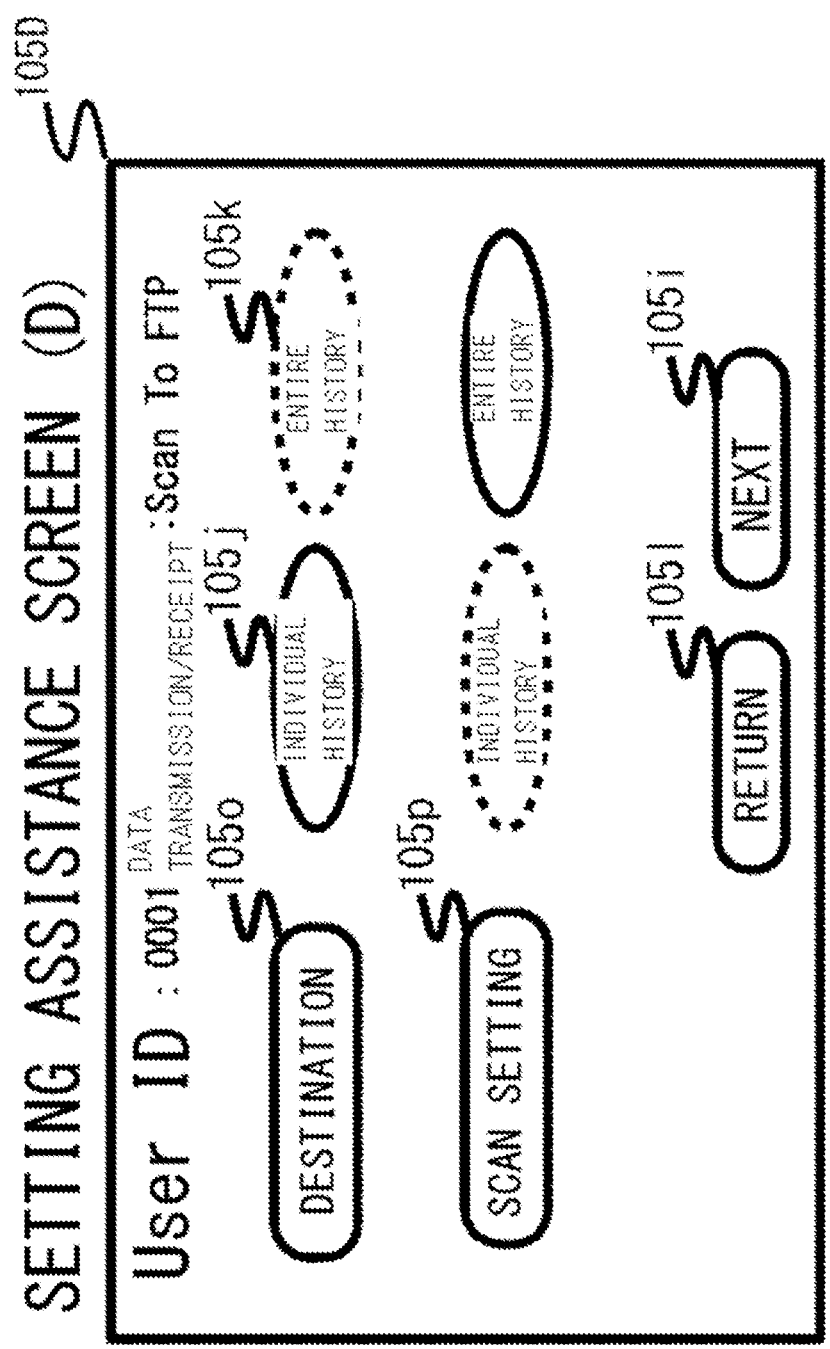
FIG. 4A, which is for explaining of contents displayed on the panel part shown in FIG. 1, shows a setting assistance screen (D)

Next, FIG. 4A shows the setting assistance screen (D) 105D that the system control part 121 displays on the panel part 105 according to the above described setting assistance program if the data transmission/reception selection field 105*h* is selected on the setting assistance screen (A) 105A shown in FIG. 2B. It is to be noted that the setting assistance screen (D) 105D, which is displayed when the data transmission/reception selection field 105*h* is selected, indicates contents related to settings for using Scan To FTP for convenience of explanation. Incidentally, Scan To FTP is a function that can transmit, for example, image data of a document read by the scanner part 101 to a server connected to the network 300.

On the setting assistance screen (D) 105D, for example, as selection items, there are displayed a destination selection field 105*o* indicating a setting item and a scan setting field 105*p*. The individual history selection field 105*j* and the entire history selection field 105*k* are displayed in correlation to each of the destination selection field 105*o* and the scan setting field 105*p*. Each of the destination selection field 105*o* and the scan setting field 105*p* is available to select either one of the individual history selection field 105*j* and the entire history selection field 105*k*. On the setting assistance screen (D) 105D shown in FIG. 4A, individual history selection field 105, which is correlated to that the destination selection field 105*o* is selected as initial setting, is displayed within solid-line frame. On the setting assistance screen (D) 105D shown in FIG. 4A, the entire history selection field 105*k*, which is correlated to that the scan setting field 105*p* is selected as initial setting, is displayed within solid-line frame. This indicates that the individual history field correlated to the destination setting item and the entire history field correlated to the scan setting are initially set. Here, if a touching operation is conducted on the entire history selection field 105*k* that is in correlation to the destination selection field, the display frame for the entire history selection field 105*k* is changed from dotted-line frame to the solid-line frame. On the other hand, if a touching operation is conducted on the individual entire history selection field 105*j* when the entire history selection 105*k*, the display frame for the individual history selection field 105*j* is changed from dotted-line frame to the solid-line frame. Further, if a touching operation is conducted on the individual history selection field 105*j* correlated to the scan setting field 105*p*, the display frame of the individual history selection field 105*j* is changed from dotted-line frame to solid line-frame. Conversely, if a touching operation is conducted on the entire history selection field 105*k* when the individual history selection field 105*j* is selected, the entire history selection field 105*k* is changed from within dotted-line frame to within solid-line frame. If a touching operation is conducted on the next button 105*i*, the control system part 121 fixes the selected content in the selection field displayed within solid-line frame and requests the management server 200 of providing the user ID (for example, 0001) and either one of the individual history and the entire history, as the selected operation history. If a touching operation is conducted on the next button 105*i* without conducting a touching operation on neither the individual history selection field 105*j* and the entire history selection field 105*k* after the setting assistance screen (D) 105D is displayed, the system control part 121 requests the management server 200 of providing to the user ID and the initial setting operation history. In the example of FIG. 4A, requested are the user ID, the individual history as the initial setting that is correlated to the designation setting item, and the entire history as the initial setting that is correlated to the scan setting item. Further, the system control part 121, when receiving, from the management server 200, the operation history (in this case, the individual history) which is correlated to the setting item of the destination of the user ID and the operation history (herein, the entire history) which is correlated to the item of scan setting, causes, via the panel operation control part 119, the panel part 105 to display the setting assistance screen (E) 105E shown in FIG. 4B. It is to be noted that conducting a touching operation on the return button 105*l*, the display part 105 returns to display the setting assistance screen (A) 105A shown in FIG. 2B.

Figure 4B:
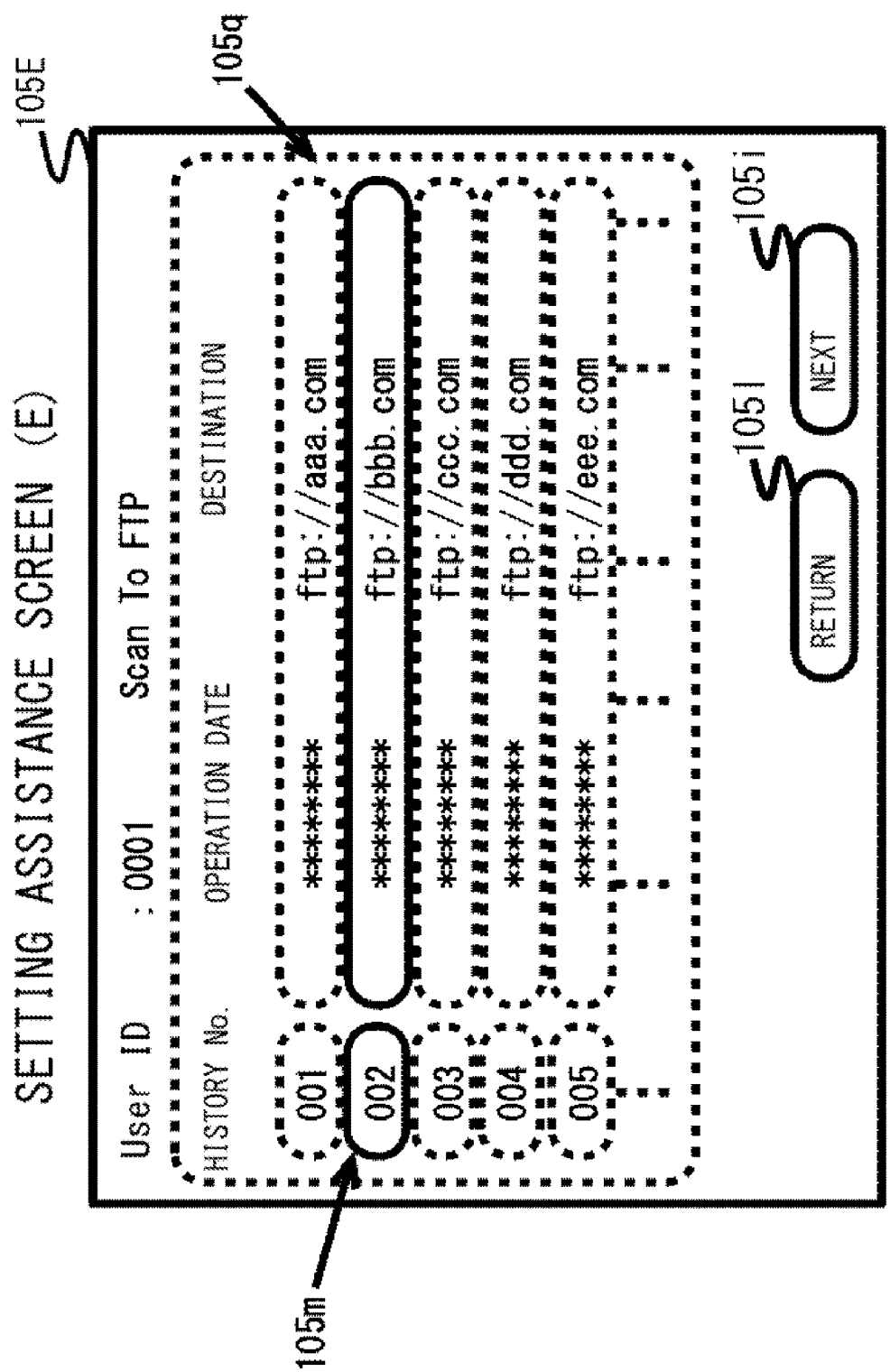
FIG. 4B, which is for explaining of contents displayed on the panel part shown in FIG. 1, shows a setting assistance screen (E)

Next, FIG. 4B shows the setting assistance screen (E) 105E for which the system control part 121 causes the panel part 105 to display according to the procedure of the setting assistance application program if the individual history field is select which is correlated to the destination selection field 105*o* on the setting assistance screen (D) 105D shown in FIG. 4A. On the setting assistance screen (E) 105E, there is displayed the destination setting information 105*q* including the operation date/time and the address of the file server i.e., an FTP server in correlation to the history number selection field 105*m*. It is to be noted that that the designation setting information 105*q* correlated to the history number selection field 105*m* may be arranged either from newest operation date/time to the oldest (descending order) or from oldest operation date/time to the newest (ascending order). Also, available arrangement is in descending order of the use frequency (for example, the frequency at which the process was executed based on the selected destination setting information 105*q* or the frequency at which the selected destination setting information 105*n* was confirmed for execution of the process). Here, if a touching operation is conducted, for example, on 002 of the history number selection field 105*m*, the display frame of the copy setting information 105*n* is changed from within the dotted-line frame to within the solid-line frame. Incidentally, for example, the destination setting information 105*q* correlated to 002 of the history number selection field 105*m* is made up of the operation date/time as well as FTP server address (for example, ftp://bbb.com). Then, for example, if conducting a touching operation on the next button 105*i* after selecting with a touching operation on 002 of the history number selection field 105*m*, the system control part 121 causes the panel part 105 to display the setting assistance screen (F) 105F shown in FIG. 4A in a manner via panel operation control part 119.

It is to be noted that if a touching operation is conducted on the return button 105*l*, the setting assistance screen (D) 105D shown in FIG. 4A appears again.

Next, FIG. 4C shows the setting assistance screen (F) 105E for which the system control part 121 causes the panel part 105 to display according to the procedure of the setting assistance application program if the entire history field is selected which is correlated to the scan setting system field 105*o* on the setting assistance screen (D) 105D shown in FIG. 4A.

The setting assistance screen (F) 105F shown in FIG. 4C is the screen following the setting assist screen (E) 105E shown in FIG. 4B. On the setting assistance screen (F) 105 F, scan setting information 105*r* including the operation date/time and the scan setting content is displayed in correlation to the history number selection field 105*m*. It is to be noted that that the scan setting information 105*r* correlated to the history number selection field 105*m* may be arranged either from newest operation date/time to the oldest (descending order) or from oldest operation date/time to the newest (ascending order). Also, available arrangement is in descending order of the use frequency (for example, the frequency at which the process was executed based on the selected scan setting information 105*r* or the frequency at which the selected setting information 105*r* was confirmed for execution of the process). Here, if a touching operation is conducted, for example, on 002-indexed the history number selection field 105*m*, the display frame of the scan setting information 105*r* is changed from the dotted-line frame to the solid-line frame. Incidentally, for example, the scan setting information 105*r* correlated to the 002-indexed history number selection field 105*m* is made up of a resolution (300 dpi), a file format (gif), a reading size (A3) as well as the operation date/time. Then, for example, if a touching operation is conducted on the next button 105*i* after conducting a touching operation on the 002-indexed history number selection field 105*m*, the system control part 121 causes the setting operation management part 118 to manage the selected scan setting information 105*r*. Further, the system control part 121 instructs the scanner control part 111 to conduct a scan operation using the scanner part 101, instructs the image processing part 117 to perform image processing, and instructs the communication control part 114 to conduct a transmission. At this time, the scanner control part 111, the image processing part 117, and the communication control part 114 execute their respective processing operations based on the scan setting information 105*r* managed by the setting operation management part 118. It is to be noted that if a touching operation is conducted on the return button 105*l*, the display part 105 returns to display the setting assistance screen (E) 105E shown in FIG. 4B.

Next, the setting assistance application program will be described. The setting assistance application program, which is assigned to each user, includes a single user ID and operation history type information (setting history type information). The operation history type information indicates whether the operation history to be downloaded is an individual history or an entire history for each the selection item. For example, for each function as a selection item of the MFP 100, the operation history type information indicates the operation histories to be downloaded that include the copy function correlated individual history, the print function correlated entire history, and the FAX function correlated individual history. In addition, for example, for each function as a selection item of the MFP 100, the operation history type information indicates the operation histories to be downloaded that include the destination correlated individual history, and the scan setting correlated entire history. The setting operation history indicated in the operation history type information is displayed as initial settings in the setting assistance screen (B) 105 B and the setting assistance screen (D) 105D.

The setting assistance application program, which is executed after being downloaded to the MFP 100, causes the MFP 100 to conduct a series of processing for downloading the operation history correlated to each the selection item. Further, the setting assistance application program may be executed after being downloaded to the MFP 100 in order for the MFP 100 to perform a series of processing including Steps S105 to S111*a* and Steps S114 to S113 which will be described later or other processing similar to these Steps.

Next, with reference to FIG. 5, the setting processing by the MFP 100 will be described. The following description is based on the assumption that if the data transmission/reception selection field 105*h* is selected on the setting assistance screen (A) 105A shown in FIG. 2B, for example, the setting assistance screen (D) 105D shown in FIG. 4A correlated to Scan To FTP is displayed. The following description is also based on that for example if the copy selection field 105*f* is selected from the print selection field 105*e*, the copy selection field 105*f*, and the FAX selection field 105*g* other than the data transmission/reception selection field 105*h*, the setting assistance screen (B) 105B for each the function is displayed.

(Step S101)

The system control part 121 determines whether or not downloading the operation history is requested.

In this case, the system control part 121 determines that no request of downloading the operation history is found, if no notification is issued which indicates an instruction for downloading the operation history via the panel part 105 (Step S101: No).

On the other hand, the system control part 121 determines that the request of downloading the operation history is found, if the notification is issued which indicates an instruction for downloading the operation history via the panel part 105 (Step S101: Yes), and the control goes to Step S102.

(Step S102)

The system control part 121 causes the login screen 105G to appear.

In this case, the system control part 121 causes the panel part 105 to display the login screen 105G shown in FIG. 2A in a manner via the panel operation control part 119.

(Step S103)

The system control part 121 issues a login request.

In this case, the system control part 121 accepts, via the panel operation control part 119, the user ID and the pass word that are inputted on the input field 105*a* and the input field 105*b*, respectively, in the login screen 105G shown in FIG. 2A.

Further, the system control part 121, when receives a notification indicating that a touching operation is conducted on the OK button 105*c*, issues the login request that includes the user ID and the pass word.

(Step S104)

The system control part 121 determines whether or not downloading the setting assistance application program completes.

In this case, the system control part 121 determines, unless a notification is received from the communication control part 114 which indicates that the setting assistance application program assigned to each the user has downloaded, that no setting assistance application programs are received (Step S104: No)

On the other hand, the system control part 121 determines, if the notification is received from the communication control part 114 which indicates that the setting assistance application program assigned to each the user has downloaded, that the setting assistance application programs are received (Step S104: Yes), and the control goes to Step S105.

It is to be noted that the system control part 121 executes, after causing the HDD 106 to store the setting assistance application program assigned to each the user which is downloaded from the management server 200, the setting assistance application program to perform a processing according thereto.

Further, on the management server 200 side, if the authentication management part 214 allows an authentication of the user ID and password that are downloaded from the MFP 100, the system control part 217 reads the setting assistance application program correlated to the user ID stored in the HDD 202 and transmits the setting assistance application program to the MFP 100.

Moreover, on the management server 200 side, if the authentication management part 214 fails to authenticate the user ID and password that are downloaded from the MFP 100, the authentication management part 214 transmits an error message to the MFP 100. In this case, the system control part 121 on the MFP 100 side causes the panel part 105 to display the contents of the error message in a manner via the panel operation control part 119.

(Step S105)

The system control part 121 displays the setting assistance screen (A) 105A indicating function-selection correlated contents.

In this case, in accordance with the procedure of the setting assistance application program, the system control part 121 causes the panel part 105 to display the setting assistance screen (A) 105A shown in FIG. 2B which is correlated to the user ID (for example, 0001) in a manner via the panel operation control part 119.

(Step S106)

The system control part 121 determines whether or not a function has been selected.

In this case, the system control part 121 determines that no function is selected if no notification is received from the panel operation control part 119 which indicates that either one of the print selection field 105*e*, the copy selection field 105*f*, the FAX selection field 105*g*, and the data transmission/reception selection field 105*h* is selected on the setting assistance screen (A) 105A (Step S106: No).

On the other hand, the system control part 121 determines that a function is selected if a notification is received from the panel operation control part 119 which indicates that either one of the print selection field 105e, the copy selection field 105f, the FAX selection field 105g, and the data transmission/reception selection field 105h is selected on the setting assistance screen (A) 105A (Step S106: Yes), and the control goes to Step S107.

(Step S107)

The system control part 121 determines whether or not the data transmission/reception has been selected.

In this case, the system control part 121 determines that the data transmission/reception is not selected if a notification is received from the panel operation control part 119 which indicates that either one of the print selection field 105e, the copy selection field 105f, and the FAX selection field 105g has been selected on the setting assistance screen (A) 105A (Step S107: No), and the control goes to Step S108. It is to be noted that in this case, selecting the copy selection field 105f is assumed.

On the other hand, the system control part 121 determines that the data transmission/reception is selected if a notification is received from the panel operation control part 119 which indicates that the data transmission/reception selection field 105h is selected on the setting assistance screen (A) 105A (Step S107: Yes), and the control goes to Step S114.

(Step S108)

The system control part 121 causes the setting assistance screen (B) 105B to appear.

In this case, according to the procedure of the setting assistance application program, the setting operation management part 118 causes the panel part 105 to display the setting assistance screen (B) 105B correlated to the user ID (for example, 0001) in a manner via the panel operation control part 119. The system control part 121 receives a touching operation conducted on the setting assistance screen (B) 105B from the panel operation control part 119.

(Step S109)

The system control part 121 determines whether or not a touching operation is conducted on the next button 105i.

In this case, the system control part 121 determines that the history type is not selected unless a notification is received from the panel operation control part 119 which indicates that a touching operation is conducted on the next button 105i on the setting assistance screen (B) 105B (Step S109: No).

On the other hand, the system control part 121 determined that the history type is selected if a notification is received from the panel operation control part 119 which indicates that a touching operation is conducted on the next button 105i on the setting assistance screen (B) 105B (Step S109: Yes), and the control goes to Step S110. It is to be noted that in this case selecting the individual history selection field 105j on the setting assistance screen (B) 105B is assumed.

(Step S110)

The system control part 121 downloads an operation history of the selected history type.

In this case, the system control part 121 requests the management server 200 of the individual history that correlates to the user ID (for example, 0001) and copy operation setting.

In addition, the system control part 121 downloads the individual history correlated to the copy setting operation of the user ID (for example, 0001) from the management server 200 and causes the HDD 106 to store the downloaded individual history.

(Step S111)

The system control part 121 causes the setting assistance screen (C) 105C to appear.

In this case, in accordance with the procedure of the setting assistance application program, the system control part 121 causes the panel part 105 to display the setting assistance screen (C) 105C shown in FIG. 3B in a manner via the panel operation control part 119.

The system control part 121 receives a touching operation on the setting assistance screen (C) 105C from the panel operation control part 119. If a touching operation is conducted on one of the history number selection fields 105m and then the next button 105i is conducted with a touching operation, that is, upon receipt of a notification from the panel operation control part 119 which indicates that a touching operation is conducted to the next button 105i on the setting assistance screen (C) 105C from the panel operation control part 119, the system control part 121 causes the control to go to Step S111a.

(Step S111a)

The system control part 121 causes the panel part 105 to display a normal setting screen that allows for setting the setting contents of each the setting item individually in a manner via the panel operation control part 119. At this time, the system control part 121 reflects the setting information selected on the setting assistance screen (C) 105C in step S111 and managed by the setting operation management part 118 on the normal setting screen.

The system control part 121 accepts a change in setting content by the user. Changing the setting content, here, is optional. The system control part 121, upon receipt of changing the setting content, causes the setting operation management part 118 to manage setting information correlated to the changed setting content.

(Step S112)

If a processing executing operation is input from the panel part 105 via the panel operation control part 119, the system control part 121 causes the processing to be executed according to the selected setting content.

In this case, the system control part 121 causes the printer control part 112 and the image processing part 117 to execute copy processing. At this time, the printer control part 112 and the image processing part 117 execute the copy processing based on the copy setting information 105n of the setting assistance screen (C) 105C managed by the setting operation management part 118.

(Step S113)

The system control part 121 deletes the downloaded information.

In this case, the system control part 121 deletes the setting assistance application program downloaded from the management server 200 in step S104 and the individual history downloaded in step S110 and terminates the processing. As a result, it is possible to suppress the reduction in the storage capacity of the HDD 106.

(Step S114)

The system control part 121 causes the setting assistance screen (D) 105D to appear.

In this case, in accordance with the procedure of the setting assistance application program, the system control part 121 causes the panel part 105 to display, in a manner via the panel operation control part 119, the setting assistance screen (D) 105D shown in FIG. 4A which is related to, for example, Scan To FTP to which the user ID (for example, 0001) correlates.

It is to be noted that if the data transmission/receipt selection field 105h is selected on the setting assistant screen (A) 105A shown in FIG. 2B, the system control part 121 causes, in accordance with the procedure of the above assistance application program, the panel part 105 to display setting assistance screen (D) 105D. The system control part 121 accepts a touching operation from the panel operation control part 119 which is conducted on the setting assistance screen (D) 105D.

(Step S115)

The system control part 121 determines whether or not a touching operation is conducted on the next button 105i.

In this case, the system control part 121 determines the history type is not selected unless a notification is transmitted from the panel operation control part 119 which indicates that a touching operation is conducted on the next button 105i on the setting assistance screen (D) 105D (Step S115: No).

On the other hand, the system control part 121 determines the history type is selected if a notification is transmitted from the panel operation control part 119 which indicates that a touching operation is conducted on the next button 105i on the setting assistance screen (D) 105D (Step S115: Yes), and the control goes to Step S116. It is to be noted that in this Step, on the setting assistance selection screen (D) 105D, an individual history selection field 105j correlated to the designation selection field 105o and an entire history selection field 105k correlated to the scan setting field 105p are assumed to be selected.

(Step S116)

The system control part 121 downloads the setting history of the selected history type.

In this case, the system control part 121 request the management server 200 of providing an individual history that the designation field selects and an entire history that the scan setting field selects which are correlated to the user ID (for example, 0001).

In addition, the system control part 121, after downloading the individual history that the designation field selects and the entire history that the scan setting field selects which are correlated to the user ID (for example, 0001), causes the HDD 106 to store the downloaded individual history and entire history.

(Step S117)

The system control part 121 causes the setting assistance screen (E) 105E to appear.

In this case, in accordance with the procedure of the setting assistance application program, the system control part 121 causes the screen part 105 to display the setting assistance screen (E) 105E shown in FIG. 4B that is correlated to the user ID (for example, 0001) in a manner via the panel operation control part 119.

It is to be noted that the setting assistance screen (E) 105E is indicative of the setting history that correlates to the selection of the individual history selection field 105j correlated to the destination selection field 105o on the setting assistance screen 105F. The system control part 121 receives a touching operation conducted on the setting assistance screen (E) 105E from the panel operation control part 119.

(Step S118)

The system control part 121 determines whether or not setting information is selected from the operation history of the destination.

In this case, the system control part 121 determines that setting information is not selected from the operation history of the destination unless a notification is transmitted from the panel operation control part 119 which indicates that the destination setting information 105q correlated to the history number selection field 105m is selected on the system assistance (E) 105E (Step S118: No).

On the other hand, the system control part 121 determines that setting information is selected from the operation history of the destination if a notification is transmitted from the panel operation control part 119 which indicates that the destination setting information 105q correlated to the history number selection field 105m is selected on the system assistance (E) 105E (Step S118: Yes).

The system control part 121 causes the control to go to Step S119 if a touching operation is conducted on the next button 105i after conducting a touching operation on either one of the history number selection fields 105m, that is, if a notification is transmitted from the panel operation control part 119 which indicates that a touching operation is conducted on the next button 105i on the setting assistance screen (E) 105E.

It is to be noted that in this Step, on the setting assistance screen (E) 105E, the destination setting information 105q is assumed to be selected that is correlated to, for example, 002-indexed history number selection field 105m.

(Step S119)

The system control part 121 causes the sixth setting assistance screen (F) 105F to appear.

In this case, in accordance with the procedure of the setting assistance application program, the system control part 121 causes the panel part 105 to display the setting assist screen (F) 105F shown in FIG. 4C as the entire history in a manner via the panel operation control part 119.

It is to be noted that the setting assistance screen (F) 105F is an operation history that is accordant to the entire history selection field 105k correlated to the scan setting field 105P is selected on the setting assistance screen 105F. The system control part 121 receives a touching operation conducted on the setting assistance screen (F) 105F from the panel operation control part 119.

(Step S120)

The system control part 121 determines whether or not the setting information is selected from the operation history of the scan setting.

In this case, the system control part 121 determines that setting information is not selected from the operation history of the scan setting unless a notification is transmitted from the panel operation control part 119 which indicates that the scan setting information 105r correlated to the history number selection field 105m on the system assistance (F) 105F is selected (Step S120: Yes).

On the other hand, the system control part 121 determines that setting information is selected from the operation history of the scan setting if a notification is transmitted from the panel operation control part 119 which indicates that the scan setting information 105r correlated to the history number selection field 105m on the system assistance (F) 105F is selected (Step S120: No).

The system control part 121 causes the control to go to Step S111a if a touching operation is conducted on the next button 105i after conducting a touching operation on either one of the history number selection fields 105m, that is, if a notification is transmitted from the panel operation control part 119 which indicates that a touching operation is conducted on the next button 105i on the setting assistance screen (E) 105E.

It is to be noted that in this step, on the setting assistance screen (F) 105F, the scan setting information 105r is assumed to be selected that is correlated to, for example, 002-indexed history number selection field 105m.

The system control part 121, when the control goes to Step S111a, causes the panel part 105 to display, in a manner via the panel operation control part 119, a normal setting screen on which a setting content of each the setting item can be set individually. At this time, the system control part 121 causes the setting information selected on the setting assistance screen (E) 105E in Step 117 and the setting information selected on the setting assistance screen (F) 105F in Step 119 which are under management of the setting operation management part 118 to reflect on the normal setting screen.

The system control part 121 accepts a change of the setting content by a user. Changing the setting content is arbitrary. The system control part 121, upon acceptance of the changed setting content, causes the setting operation management part 118 to manage setting information correlated to the changed setting content, and the control goes to Step S112.

Then, the system control part 121, when the control goes to Step S112, causes the scanner control part 111 to conduct a reading operation using the scanner part 101, causes the image processing part 117 to conduct image processing, and causes the communication control part 114 to perform communication. At this time, the scanner control part 111, the image processing part 117, and the communication control part 114 execute their own processing based on the scan setting information 105*r* selected on the setting assistance screen (F) 105F that the setting operation management part 118 manages and the destination setting information 105*q* selected on the setting assistance screen (E) 105E that the setting operation management part 118 manages.

In addition, the system control part 121, when the control goes to Step S113, deletes the setting assistance application program downloaded from the management server 200 in Step S104, the individual history correlated to the destination which is downloaded in Step S116, and the entire history correlated to the scan setting, and terminates this job processing.

It is to be noted that if the setting information is changed in Step S111*a*, the system control part 121 transmits the changed setting information to the management server 200 as an operation history in correlation to the user ID. The system control part 217 of the management server 200 causes the HDD 202 to store the setting information received from the MFP 100 as an individual history as well as an entire history which are correlated to the user ID.

In such a way, in the present embodiment, in accordance with the procedure of setting assistance application program assigned to each user which is downloaded from the management server 200, the system control part 121 causes the panel part 105 to display the setting assistance screen (B) 105B (the first setting assistance screen) that makes it possible to select the individual operation history or the entire operation history, as the operation history which is the setting history of the setting information, on a function basis. Then, the system control part 121 downloads the individual operation history or the entire operation history whichever is correlated to the function selected on the setting assistance screen (B) 105B (the first setting assistance screen) and causes the setting assistance screen (C) 105C (the second setting assistance screen) to display the downloaded individual operation history or entire operation history for selection acceptance. In addition, the system control part 121 causes the setting operation part 118 to manage the information of the individual operation history or the entire operation history whichever is selected on the setting assistance screen (C) 105C (the second setting assistance screen). Then, the print function, the copy function, the FAX function, and the via-network data transmission/reception function (function part) execute their own processing based on the setting information that the setting operation management part 118 manages.

As a result, for example, in case of referring to the individual operation history or the entire operation history for each of the print function, copy function, the FAX function, and the like, selecting the individual operation history or the entire operation history on the first setting assistance makes it possible, for example, to refer to the individual operation history or the entire operation history for each of the print function, copy function, the FAX function, and the like. For this reason, it is possible to greatly simplify the setting operation when using the operation history.

In the typical example of the image forming device described above in which the HDD part stores the operation history on a user basis, even though the image forming device is installed in an environment which is available by a plurality of users, it is possible to refer to the operation history on a user basis by performing individual authentication, which makes it possible to eliminate the troublesome at setting operation. In addition, in the typical example of the image forming device, items of the individual history and items of the entire history are displayed on the panel part which are selectable by conducting a touching operation thereon, which makes it possible to referee to the entire history as necessary.

However, as for the typical example of the image forming device, for example, in case of referring to an individual history that is correlated to the copy function setting operation, operations are required that include, for example, transition from the copy function setting screen to an application mode screen, selecting an operation history on the application mode, succeeding in individual authentication, and transition to the history information display screen that indicates the individual history. In addition, for referring to the entire history, it is necessary to conduct touching operations on all items of the entire history displayed on the history information screen.

More specifically, as for the typical example of the image forming device, in case of referring to the individual operation history or the entire operation history for each of the print function, copy function, the FAX function, and the like, passing through plural steps is required for reaching the history information display screen from the setting screen for each of the functions. For this reason, there is a problem that the setting operation for using the operation history is cumbersome.

In accordance with an electronic device and a recording medium of the present disclosure, downloading either one of an individual operation history and an entire operation history from a management server on a selection item basis makes it possible to refer to the individual operation history and the entire operation history on a function basis. For this reason, it is possible to greatly simplify the setting operation when using an operation history.

It is to be noted that in accordance with the procedure of the setting assistance application program, the system control part 121 may display an individual history and an entire history, as initial setting items in the setting assistance screen (D) such that the individual history is provided to the first setting item having an entry field (for example, destination setting item having an entry field such as an e-mail address or the like) on the normal setting screen, while the entire history is provided to the second setting item having selections (for example, scan setting items such as resolution, file format, and reading size which are to be selected from their correlated dialog boxes) on the normal setting screen.

In detail, the setting assistance application program may have setting item type information that serves as an indication for the first setting item to download the individual history and for the second setting item to download the entire history. In this case, the system control part 121 determines an attribute indicating which of the entry field and the selection is to be set for each setting item of the MFP 100, and determines, based on the determined attribute, whether each the setting item is correlated to the first setting item or the second setting item. Instead, the setting assistance application program may include setting item type information indicating whether each of the plural setting items of the MFP 100 is the first setting item or the second setting item. In this case, the system control part 121 determines which of the first setting item and the second setting is each setting item to which the own device correlate based on the setting item type information. The system control part 121, in accordance with the procedure of the setting assistance application program, downloads the individual history correlated to the setting item that is determined to be the first setting item from the management server 200 and the entire history correlated to the setting item that is determined to be the second setting item from the management server 200.

In addition, under a case where the operation history type information of a certain selection item is the entire history, if the usage frequency of the setting information of the entire history (the frequency at which the processing is executed based on the setting information selected from the entire history, or the frequency at which the setting information selected from the entire history is fixed for execution of the processing) is less than a the first threshold value, the system control part 121 may changes the operation history type information correlated to the target selection item from the entire history to the individual history. In this case, the system control part 121 rewrites the operation history type information of the target selection item of the setting assistance application program (stored in the HDD 106) assigned to the logged-in user from the entire history to the individual history and transmits the resulting operation history type information to the management server 200. The system control part 121 of the management server 200 causes the HDD 202 to store the received setting assistance application program as the setting assistance application program assigned to the user based on the user ID.

In the above description, under a case where the operation history type information of a certain selection item is the entire history, if the use frequency of the setting information of the entire history is less than the first threshold value and concurrently the usage frequency of the setting information of the individual history is equal to or more than a second threshold value, the system control part 121 may change the operation history type information of the target selection item from the entire history to the individual history.

Here, the first threshold value and the second threshold value may be included in the setting assistance application program or may be included in the MFP 100. In addition, the first threshold value<the second threshold value or the first threshold value<<the second threshold value may be used.

Figure 5B:
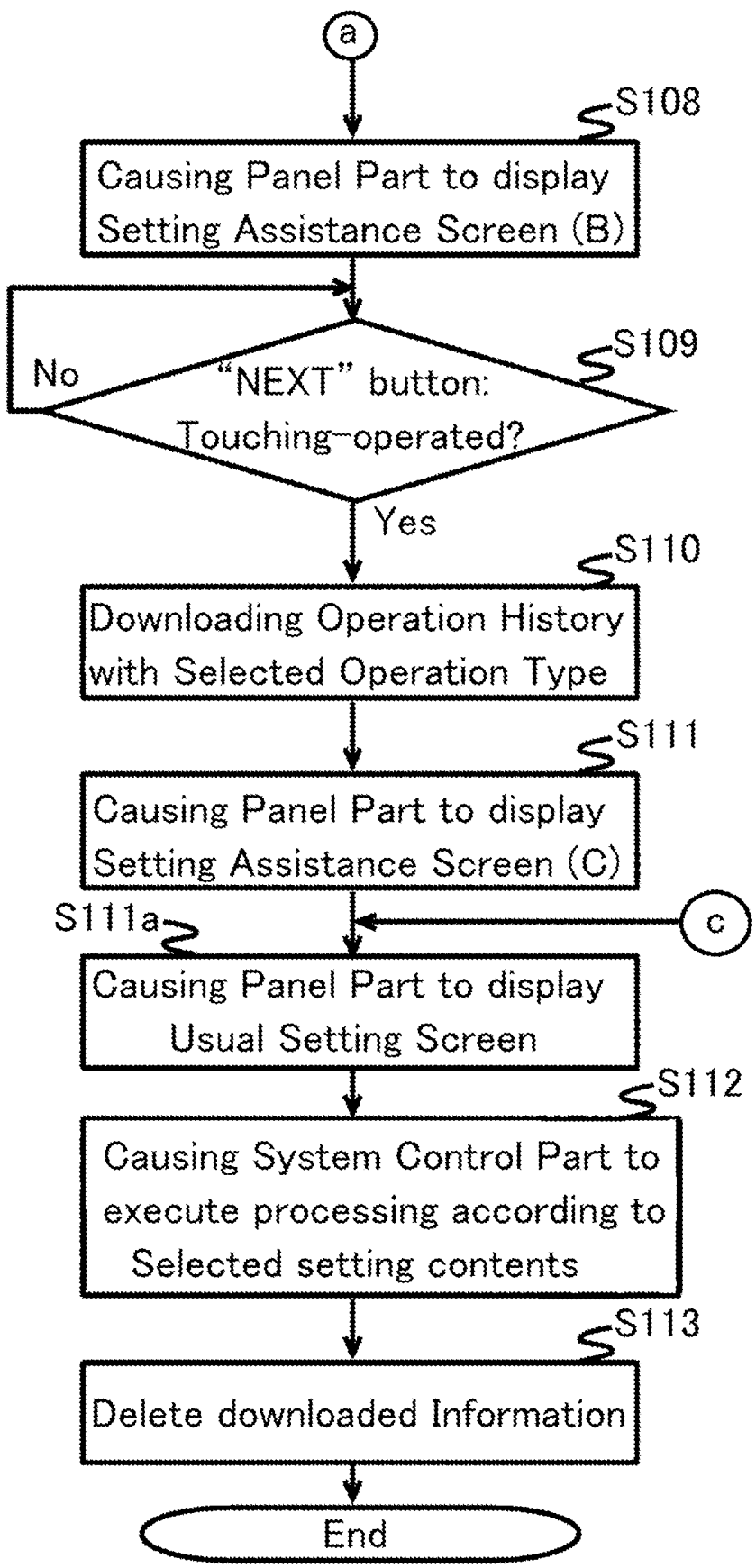
FIG. 5 shows steps of a setting processing executed by an MFP of FIG. 1.

If either one of the print selection field 105e, the copy selection field 105f, and the FAX selection field 105g is selected on the setting assistance screen (A) 105A in Step S105 shown in FIG. 5, the system control part 121 may download the operation history (for example, an operation history indicated as an initial setting in the setting assistance screen (B) 105 B, or an operation history based on the operation history type information) which is correlated to the selected function from the management server 200. In addition, if the data transmission/reception selection field 105h is selected on the setting assistance screen (A) 105A in Step S105, the system control part 121 may download, from the management server 200, the operation history correlated to the data transmission/reception (for example, the operation history, as the initial setting, displayed on the setting assistance screen (D) 105D, the operation history based on the operation history type information, or the operation history based on the setting item type information). In such a case, the system control part 121 may download the operation history selected in Step S110 only if the selection of the operation history is changed from its initial setting on setting assistance screen (B) 105B in Step S109. The system control part 121 may download the operation history selected in Step S116 only if the selection of the operation history is changed from its initial setting on setting assistance screen (D) 105D in Step S115.

Further, although the present embodiment has been described as to a case in which an electronic device of the present disclosure is applied to the MFP 100, the present disclosure is not limited to this example and therefore may be invention is applicable to other electronic devices such as a PC, a notebook computer, a tablet, and the like, which require setting information.

What is claimed is:

1. An electronic device comprising:
    a panel part;
    a system control part that conducts a download of one of an individual operation history and an entire operation history for each selection item, as setting history of selection information, from a management server according to a procedure of a setting assistance application program which has been downloaded from the management server and which is assigned to each user;
    a setting operation management part that manages the setting information included in the downloaded setting history for each the selection item; and
    a function part that executes a processing based on the setting information managed by the setting operation management part, wherein
    there are a plurality of setting items that correspond to the setting information,
    the system control part causes the panel part to display a setting screen that is capable of receiving the setting information,
    the setting information includes, if being inputted from the setting screen, a content set via a first setting item having an entry field and a content set via a second setting item having selections, and
    the system control part downloads, according to the procedure of the setting assistance application program, the individual operation history in correlation to the first setting item and the entire operation history in correlation to the second setting item.

2. The electronic device according to claim 1, wherein the system control part determines whether each the setting item is the first setting item or the second setting item based on an attribute of each the setting item that the electronic device handles.

3. The electronic device according to claim 1, wherein the setting assistance application program includes setting item type information that indicates whether each of the plurality of setting items is the first setting item or the second setting item, and the system control part determines, based on the setting item type information, whether each the setting item that the electronic device handles is the first setting item or the second setting item.

4. The electronic device according to claim 1, further comprising plural functions, wherein
the selection items are the plural functions.

5. The electronic device according to claim 1, wherein the setting assistance application program includes setting history type information that indicates for each the selection item whether the setting history to be downloaded is the individual operation history or the entire operation history,
the system control part, in accordance with a procedure of the setting assistance program, indicates the setting history for each the selection item based on the setting history type information as an initial setting and causes the panel part to display a first setting assistance screen via which the initial setting can be changed, and
the system control part downloads the setting history changed from the initial setting if the initial setting has been changed via the first setting assistance screen.

6. The electronic device according to claim 1, wherein the system control part causes, in accordance with the procedure of the setting assistance application program, the panel part to display a second setting assistance screen that indicates the downloaded setting history via which a selection is allowable to be accepted, and the setting operation management part manages the setting information that is selected from the setting history indicated by the second setting assistance screen.

7. The electronic device according to claim 1, wherein upon completion of processing that the function part executes based on the setting information, the system control part deletes the setting assistance application program downloaded from the management sever and the downloaded setting history.

8. An electronic device comprising:
a panel part;
a system control part that conducts a download of one of an individual operation history and an entire operation history for each selection item, as setting history of selection information, from a management server according to a procedure of a setting assistance application program which has been downloaded from the management server and which is assigned to each user;
a setting operation management part that manages the setting information included in the downloaded setting history for each the selection item; and
a function part that executes a processing based on the setting information managed by the setting operation management part, wherein
the setting assistance application program includes setting history type information that indicates for each the selection item whether the setting history to be downloaded is the individual operation history or the entire operation history,
the system control part, in accordance with a procedure of the setting assistance program, indicates the setting history for each the selection item based on the setting history type information as an initial setting and causes the panel part to display a first setting assistance screen via which the initial setting can be changed,
the system control part downloads the setting history changed from the initial setting if the initial setting has been changed via the first setting assistance screen, and if the setting history type information indicates the entire operation history and concurrently if the use frequency of the setting information of the entire operation history is less than a specific value, the system control part changes the setting history type information of the setting assistance program assigned to the user from indicating the entire history to indicating the individual history, and transmits the setting assistance application program including the changed setting history type information to the management server.

9. A non-transitory computer-readable recording medium that stores a setting assistance application program downloaded to an electronic device from a management server to be executed by a computer,
the setting assistance application program being assigned to each user, the setting assistance application program causing the computer to conduct a download of one of an individual operation history and an entire operation history for each selection item, as setting history of selection information, from a management server, wherein
there are a plurality of setting items that correspond to the setting information,
the setting information includes, if being inputted from the setting screen via which the setting information can be inputted, a content set via a first setting item having an entry field and a content set via a second setting item having selections,
and
the setting assistance application program causes the computer
to download the individual operation history in correlation to the first setting item and
to download the entire operation history in correlation to the second setting item.

10. The non-transitory computer-readable recording medium according to claim 9, wherein
the setting assistance application program causes the computer to determine whether each the setting item is the first setting item or the second setting item.

11. The non-transitory computer-readable recording medium according to claim 10 further comprising setting item type information that indicates whether each of the plurality of setting items is the first setting item or the second setting item.

12. The non-transitory computer-readable recording medium according to claim 9, further comprising setting history type information that indicates whether the setting history to be downloaded is the individual operation history or the entire operation history for each the selection item, wherein
the setting assistance application program causes the computer to indicate the setting history for each the selection item based on the setting history type information as an initial setting and causes the panel part to display a first setting assistance screen via which the initial setting can be changed,
and
the setting assistance application program causes, if the initial setting is changed via the first setting assistance screen, the changed setting history from the initial setting to be downloaded from the management server.

13. The non-transitory computer-readable recording medium according to claim 9, wherein the setting assistance application program causes the panel part to display a second setting assistance screen that indicates the downloaded setting history via which a selection is allowable to be accepted.

\* \* \* \* \*